Figure 1:
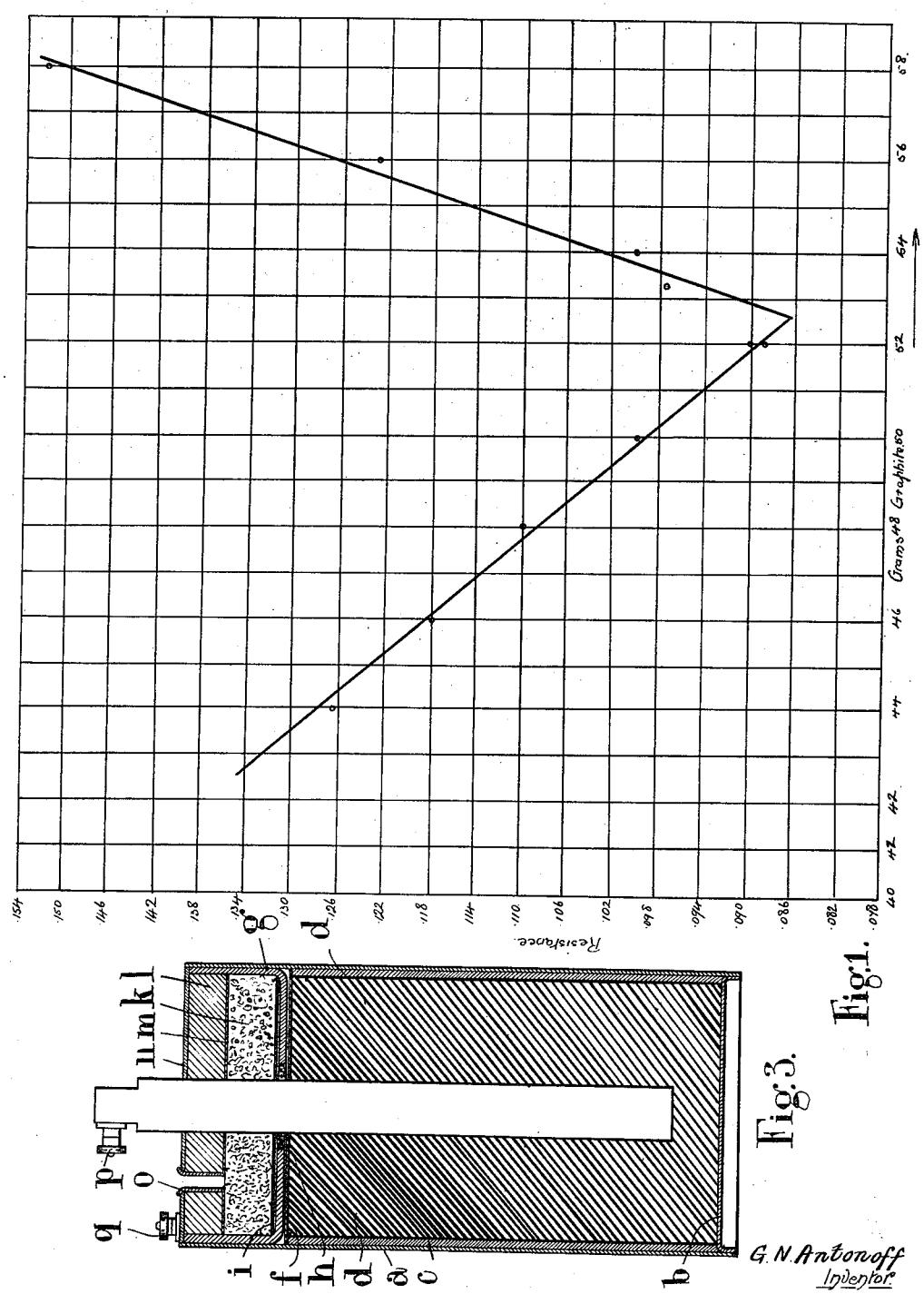

G. N. ANTONOFF.
ELECTRIC BATTERY.
APPLICATION FILED AUG. 12, 1918.

1,303,844.

Patented May 20, 1919.
2 SHEETS—SHEET 1.

G. N. Antonoff
Inventor

By H. R. Kerslake
Attorney.

G. N. ANTONOFF.
ELECTRIC BATTERY.
APPLICATION FILED AUG. 12, 1918.

1,303,844.

Patented May 20, 1919.
2 SHEETS—SHEET 2.

INVENTOR
G. N. Antonoff
H. R. Kerslake
BY
ATTORNEY

UNITED STATES PATENT OFFICE.

GEORGE NIKOLAYEVICH ANTONOFF, OF LONDON, ENGLAND.

ELECTRIC BATTERY.

1,303,844. Specification of Letters Patent. Patented May 20, 1919.

Application filed August 12, 1918. Serial No. 249,553.

*To all whom it may concern:*

Be it known that I, GEORGE NIKOLAYEVICH ANTONOFF, a subject of Russia, and residing at India House, Kingsway, London, W. C. 2, England, have invented certain new and useful Improvements Relating to Electric Batteries, of which the following is a specification.

This invention relates to electric batteries and especially to primary cells, whether in the wet or so called "dry" form, in which zinc is used as a source of energy and carbon is used for the negative pole with manganese di-oxid as the depolarizer.

The carbon electrode has usually in close contact with it a mixture consisting of finely divided manganese di-oxid and finely divided graphite, with or without an agglutinant molded or pressed together under a heavy pressure, and it has hitherto been believed that better results were obtained the higher the pressure employed.

Now I have found by experiment that there is a critical point in the relation between the internal resistance of the cell and the pressure to which the mixture of manganese di-oxid and carbon has been subjected. As the pressure to which the mixture has been submitted is increased from zero the internal resistance is found to diminish up to a point and after that is passed to increase steadily.

Further, in the ordinary Leclanché cell on closed circuit through an external resistance of, say 10 ohms, for example, the characteristic of the current or electromotive force curve plotted to a time base is that it rapidly falls from the beginning, has a short approximately horizontal part about the region of 0.8 of a volt, and then falls away rapidly again, becoming in a short time practically useless.

Now I have found that when the depolarizer mixture has been pressed to about the point which gives the least internal resistance the horizontal part of the curve is very greatly extended and the useful life of the cell becomes correspondingly greater. Such cells in which the depolarizer mixture has been compressed to about the point giving the least internal resistance form the subject-matter of my co-pending British application No. 11081 of 1917.

The object of the present invention is to improve the output of such cells.

Now the cause of the rapid falling off of current on closed circuit is due in part to the setting free of ammonia at the negative pole, which lowers the potential, and in part to the formation of insoluble salts in the capillaries of the depolarizer mass which increases the internal resistance. I have found that the output of the above described Leclanché type cells can be substantially improved by the addition of bodies fulfilling the following requirements:—

(*a*) They must have little or no action on manganese di-oxid.

(*b*) They must have little or no action on zinc in the usual battery solution; and (*c*) Their ammonia and zinc salts must be freely soluble in the battery solutions.

Suitable bodies will be found, for example, among the weak organic acids such, for example, as benzoic acid, tartaric acid, salicylic acid, or succinic acid or their homologues. Such bodies perform a two-fold function. They act at the early part of the life of the battery (while re-acting with the ammonia which tends to be set free at the negative pole) to prevent the lowering of the potential so rapidly as would otherwise take place. Again during the later part of the life of the battery after the first rapid fall of potential the bodies produced in the cell by the reaction tend to give a characteristic diminishing with time to the internal resistance of the cell. This is in contrast to the rising resistance characteristic of cells of ordinary construction.

I am aware that it has before been proposed to add acetic acid and other organic acids to ordinary Leclanché type cells, but the present invention does not relate to such ordinary cells, but only to those of the new type above indicated.

The invention consists in employing in electric cells in which the depolarizer mixture has been pressed to about the critical pressure bodies fulfilling the requirements indicated above, for example, weak organic acids such as benzoic acid, tartaric acid, salicylic acid or succinic acid or their homologues.

The invention further consists in employing in electric cells in which the depolarizer mixture has been pressed to a critical pressure bodies fulfilling the requirements indicated, incorporated in the said mixture in a finely divided state.

The invention also consists in the improved Leclanché type cells hereinafter described.

Figure 1 shows the curve obtained by plotting the internal resistances of a series of cells (determined by the Wheatstone bridge null method using a telephone as the detector) as ordinates against the apparent density of the depolarizer mass or more strictly the weight of depolarizer mixture occupying a given volume, which is a measure of the pressure to which the mass has been submitted. The actual abscissæ are weights of the graphite component of the mixture for the same volume.

Figure 2:
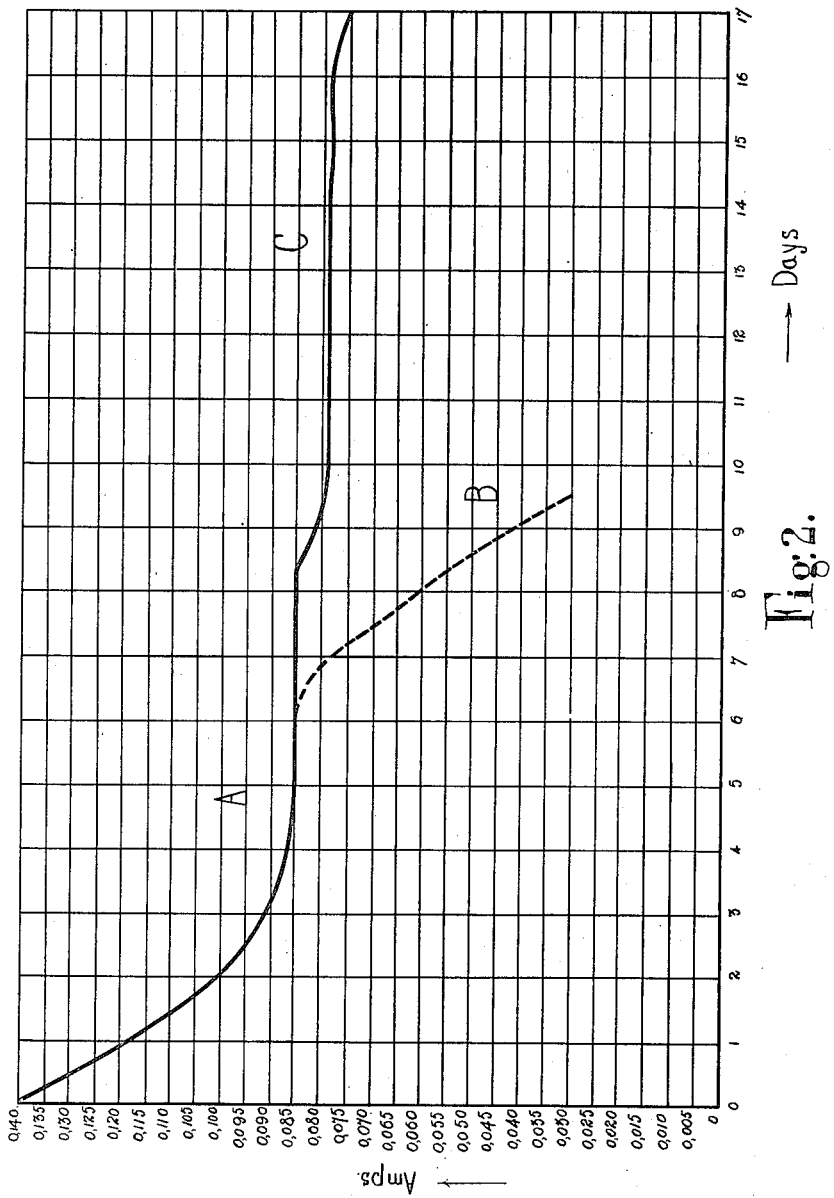

Fig. 2 illustrates typical discharge curves. The curve A—B is typical of that from an ordinary Leclanché cell, and the curve A—C is typical of that from a cell according to the present invention. These discharge curves are obtained by discharge through an external resistance of 10 ohms with a cell of 55 mm. square by 125 mm. long.

Fig. 3 illustrates diagrammatically one form of cell according to this invention, in which $a$ is a zinc cylinder sufficiently thick not to be deformed by any pressure developing during working. The bottom $b$ is conveniently formed of a dished disk, autogenously welded to the cylinder. $c$ is the usual absorbent layer employed inside the cylinder to permit only of electrolytic conduction between the zinc and the carbon poles. $d$ is the depolarizer mass, and $e$ is the carbon electrode; $f$ is a layer of paper on the top of the depolarizer mass; $g$ is a zinc cover plate with upwardly projecting flange and a hole somewhat larger than the diameter of the carbon, to permit of the insertion of a centralizing ring of cardboard $h$. $i$ is another paper washer placed on the top of the zinc disk and cardboard ring. $k$ is a layer of husks to absorb any liquid which may exude from the cell. $l$ is a layer of pitch sealing in the husks in position; and $m$ is a further paper disk separating the pitch and the husks. $n$ is a layer of bitumen on the top of the pitch, and $o$ is a vent through the pitch and bitumen. The zinc cap or disk $g$ is autogenously welded in place in the zinc cylinder and is stiff enough to prevent any longitudinal expansion of the depolarizer mass during the life of the cell. $p$ is a carbon terminal, and $q$ a terminal on the zinc cylinder.

In carrying this invention into effect in one form as applied to Leclanché type cells in which the negative pole is prepared according to my co-pending British application No. 11081 of 1917, I prepare the mixture of manganese dioxid and graphite, about 40% graphite and 60% manganese dioxid, and I add a small proportion, say about 1% of benzoic acid in a finely divided state. I then make up the mixture into a paste with distilled water and fill it in around the carbon plate into a molding cylinder. Pressure is then applied by means of suitable molding blocks in a screw or hydraulic press, and the predetermined pressure thus put upon the depolarizer mass.

It is found that with all the ordinary varieties of the components of the mixture there is a critical region of pressure within which the internal resistance attains a minimum value. The absolute value of this critical pressure, however, varies with the actual materials used, namely, with the quality and state of division of the graphite and the manganese dioxid. It is therefore necessary to determine for every given batch of materials what the critical pressure is. This may be done readily by an actual experiment, making a number of cells with different pressures and plotting the internal resistance against the different pressures.

When the depolarizer has been molded around the plate under the critical pressure as above described, it is removed from the press and the molded block is forced out of the mold. It will be found that its surface is still slightly plastic, so that it can be slightly deformed with the fingers. The critical pressure may vary from about 20 lbs. to about 70 lbs. per square inch.

The negative pole thus prepared is placed in a zinc container with the usual solution soaked lining and the cell completed in the usual way, care being taken that the container is a good enough fit, and strong enough to retain the pressure.

The presence of the additional body, benzoic acid in this case, tends to prevent the formation of insoluble salts which are apt to clog up the capillaries of the depolarizer, and thus tends to keep the internal resistance low, and it also prevents the carbonic acid of the air acting deleteriously upon the cell. In one instance, for example, I have found that the cell prepared in the way indicated above and tested on an external resistance of 5 ohms had only fallen to .92 of a volt after eleven days working, and the internal resistance had fallen 40% below its initial value.

Having now described my invention what I claim as new and desire to secure by Letters Patent is:—

1. An electric cell having its depolarizer molded under about the critical pressure giving minimum internal resistance and containing a small proportion of one or more weak organic acids.

2. An electric cell having a depolarizer mixture subjected to a pressure in the region of the critical pressure giving an internal resistance to the cell about a minimum value and containing a small proportion of a weak organic acid.

3. An electric cell having a depolarizer mixture subjected to a pressure in the region of the critical pressure giving an internal resistance to the cell about a minimum value and containing a small proportion of a plurality of weak organic acid.

4. An electric cell having a depolarizer mixture subjected to a pressure in the region of the critical pressure giving an internal resistance to the cell about a minimum value and containing a small proportion of benzoic acid.

5. A dry cell of the Leclanché type having its depolarizer molded under the critical pressure giving minimum internal resistance and containing a small proportion of a weak organic acid.

6. A dry cell of the Leclanché type having its depolarizer molder under the critical pressure giving minimum internal resistance and adapted to maintain the critical pressure throughout the life of the cell and having as an ingredient of the depolarizer a weak organic acid.

7. A depolarizer for an electric cell consisting of a mixture containing manganese dioxid, carbon and a body fulfilling the following requirements:—(a) having little or no action on manganese dioxid; (b) little or no action on zinc; (c) its ammonia and zinc salts must be freely soluble in the battery solution; said depolarizer being subjected to a pressure in the region of the critical pressure giving an internal resistance to the cell about a minimum value.

8. A depolarizer for an electric cell consisting of a mixture containing manganese dioxid, carbon and a body fulfilling the following requirements:—(a) having little or no action on manganese dioxid; (b) little or no action on zinc; (c) its ammonia and zinc salts must be freely soluble in the battery solution; said depolarizer being subjected to a pressure in the region of the critical pressure giving an internal resistance to the cell about a minimum value, together with means for maintaining the aforesaid resistance at about the minimum value.

9. A depolarizer for an electric cell consisting of a mixture containing manganese dioxid, carbon and a weak organic acid subjected to a pressure in the region of the critical pressure giving internal resistance to the cell about a minimum value.

In testimony whereof I have signed my name to this specification.

GEORGE NIKOLAYEVICH ANTONOFF.